Feb. 21, 1967  J. L. BARDEN  3,305,659
LIQUID DIVERTING SWITCH ACTUATOR
Filed March 23, 1965
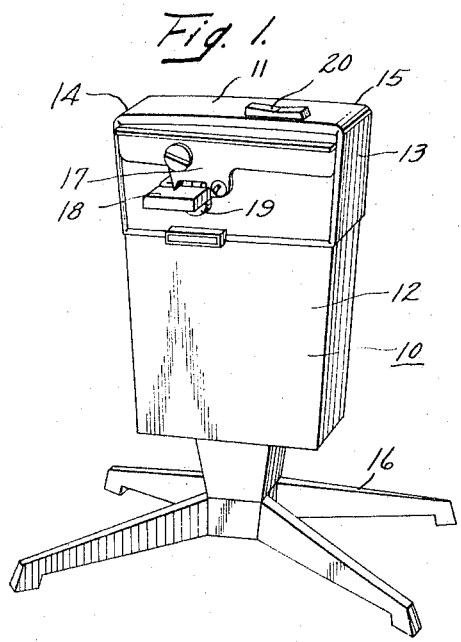
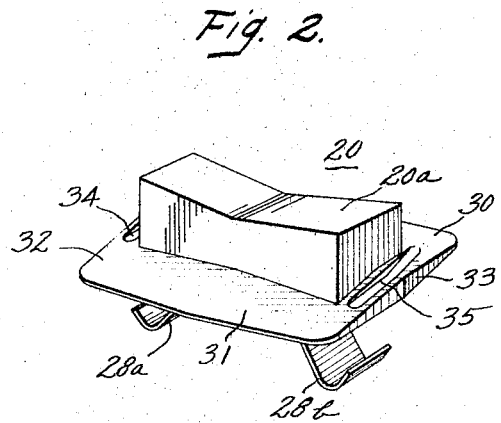
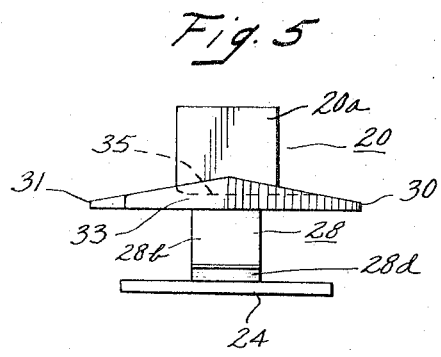
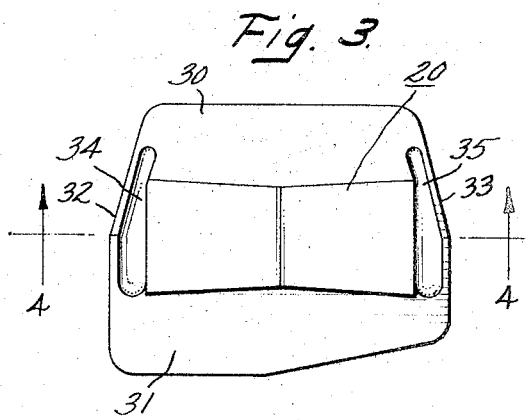
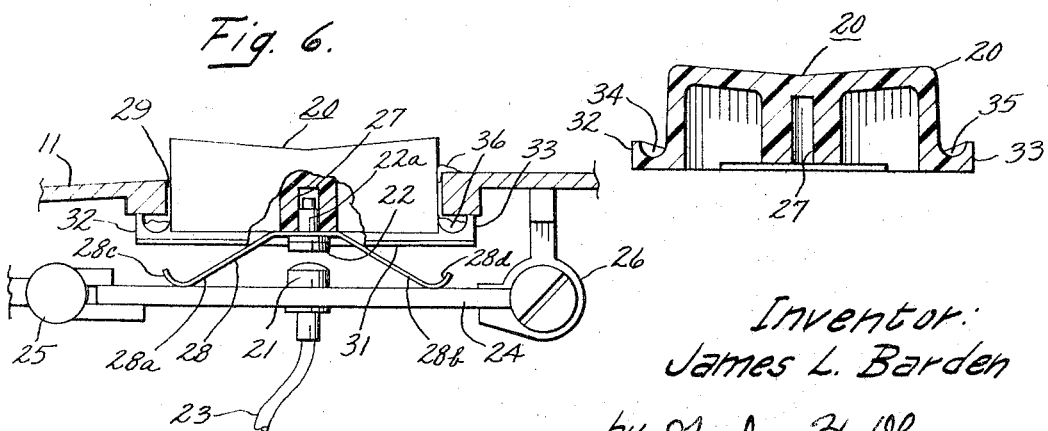
Inventor:
James L. Barden
by Gordon H. Olson
Attorney

United States Patent Office 3,305,659
Patented Feb. 21, 1967

3,305,659
LIQUID DIVERTING SWITCH ACTUATOR
James L. Barden, Los Gatos, Calif., assignor to General Electric Company, a corporation of New York
Filed Mar. 23, 1965, Ser. No. 442,095
6 Claims. (Cl. 200—172)

This invention relates to a liquid diverting switch knob or actuator which is particularly useful for electric switches located in a horizontal wall of a motorized appliance such as an electric can opener.

For ease of operation it is frequently desirable that the electric switch for a kitchen applicance be located in the top wall of the appliance. It is also necessary that electric kitchen appliances be designed so that they can be easily kept clean; at a minimum, a housewife should be able to wipe the surfaces of the appliance with a wet sponge without fear of causing a malfunction of the appliance. When wiping with a sponge over a switch which is located in the top or horizontal wall of an appliance, it is quite possible that a certain amount of water may seep between the switch button or actuator and the surrounding aperture into the interior of the housing. For simplicity of design, it is usually quite desirable that the switch area be located directly beneath the external actuator. Hence, the electrical switch located within the housing should be protected from such liquid so that the appliance circuitry is not inadvertently grounded or shorted.

Accordingly, it is a primary object of this invention to provide an electrical switch which may be located in a horizontal wall of the housing for a motorized appliance and which includes means for protecting the switch contact area from possible liquid seepage into the housing.

It is a further object of the invention to provide a unique liquid diverting switch actuator, particularly suited for being located in a horizontal wall of an electric appliance.

In carrying out the objects of this invention in one form thereof, there is provided a motorized appliance housing having a top wall with an aperture formed therein, and an electrical switch mechanism for controlling the energization of the motor. The switch mechanism includes a manually operated actuator having a projection extending upwardly through the housing aperture and having laterally extending flanges engaging the lower surface of the housing top wall. Within the housing there is positioned a pair of switch contacts controlling the energization of the appliance and including a fixed contact mounted beneath the aperture in the top wall and a contact movable by the switch actuator for cooperation with the fixed contact. A metallic resilient element positioned adjacent the contacts urges the actuator upwardly into the aperture in the top wall. The flange on the actuator is formed so that any liquid seeping through the housing aperture and contacting the flange is ducted away from the switch contact area. This arrangement effectively prevents inadvertent electrical connection between the two contacts and also prevents electrical grounding of the appliance through the metallic resilient member to the surrounding metallic housing.

Further features and advantages of this invention may best be understood by reference to the following description taken in connection with the accompanying drawings in which:

FIG. 1 is a perspective view of an electric can opener incorporating the improved switch arrangement of this invention;

FIG. 2 is a perspective view of the unique liquid diverting actuator of this invention;

FIG. 3 is a top plan view of the actuator of FIG. 2;

FIG. 4 is a cross-sectional view along the lines 4—4 of FIG. 3;

FIG. 5 is an end elevational view of the actuator of FIG. 2 and the switch support plate; and FIG. 6 is an enlarged elevational, partially sectionalized, view of the switch assembly of the invention.

The new switch arrangement of the invention is shown by way of example incorporated in the electric can opener shown in FIG. 1 having a main housing 10, with a top wall 11, front wall 12, side walls 13 and 14, and rear wall 15, all supported by a suitable stand 16. The can opener further includes a piercing and cutting mechanism 17, a lid holding mechanism shown generally at 18, a can drive means 19 and an electrical switch actuator 20 extending through the top wall 11 of the housing. The actuator 20 is manually operated to control an electric motor (not shown) located within the housing to drive through a suitable mechanism the drive means 19.

Since a disclosure of the motor and drive mechanism is not necessary to an understanding of this invention, they are not described herein; however, if such information is desired, reference may be made to a copending patent application by A. H. Freeman and D. M. Seaburg, filed March 26, 1965, Serial No. 443,146, and assigned to same assignee as the present application. The can lid holding arrangement 18 is fully described and claimed in copending application, Serial No. 333,874, Freeman, filed December 27, 1963, now Patent No. 3,222,780, and assigned to the assignee of this application.

The switching arrangement seen in FIG. 6 for controlling the energization of the can opener includes a pair of normally open switch contacts 21 and 22. Contact 21 is shown connected to an electrical lead 23, and it will be understood that contact 22 is also connected to a lead, not shown, with both leads being linked to the motor circuitry.

Contact 21 is fixed to insulating support plate 24 mounted between grooves formed in bosses 25 and 26 which are integral with the metallic housing 10. Contact 22 is supported on actuator 20 by means of an upwardly extending shank 22a which is forced into an aperture 27 formed in the actuator as seen in FIG. 4. Preferably, contact 22 acts as a fastener to secure an inverted roughly U-shaped resilient element 28 to the lower surface of manually actuator 20. As can be seen, the resilient element 28 has a pair of legs 28a and 28b with curved feet 28c and 28d which engage insulating plate 24 so that actuator 20 is urged upwardly into the aperture into the upper housing wall 11. Laterally extending flanges 30, 31 and 32 and 33 formed with actuator 20 are pressed upwardly against the inner surface of the top wall of the housing thereby limiting the movement of the actuator.

It will be recognized that the normally open switch can be closed by depressing the upper rectangular projection 20a of actuator 20 so that movable contact 22 is moved downwardly to engage fixed contact 21. In operation of the can opener it is only necessary to place a can in position with respect to the can cutting mechanism and the lid holder and depress actuator 20 to initiate cutting. It is quite convenient to have the switch actuator located in the top surface of the housing in that it is readily accessible and it is easier to press down against something substantial than it is to press sideways if the actuator were positioned in one of the side walls of the housing.

As previously mentioned, the user of the appliance should be able to wipe the external surfaces of the housing to clean the can opener for purposes of sanitation and appearance. However, when wiping the top surface with a wet sponge, it is possible that water or soap solution may seep into the housing through the slight gaps between the actuator and the surrounding housing surfaces. If such liquid were permitted to fall directly down, it can be seen from FIG. 6 that the liquid would fall onto insulating plate 24 and it is possible that the liquid might form an electrically conductive path between the metallic lugs 25 or 26 and the adjacent legs of resilient element 28. Such connections would of course ground the appliance, make the housing electrically "hot," and render the appliance inoperative. It is also possible that liquid could bridge the gap between contacts 21 and 22 so that the motor would remain energized at all times.

In accordance with this invention, the switch actuator 20 has been uniquely designed to divert any such liquid seepage away from the critical switch contact area. As can be seen in FIG. 5, opposite flanges 30 and 31 taper downwardly as they move away from actuator projection 20a. It can also be seen that the flanges 30 and 31 extend outwardly beyond the edges of insulating plate 24. Thus, any liquid seeping between the longer side edges of projection 20a and the adjacent edges of aperture 29 flows down the flange surfaces 31 and 32 and drips harmlessly away from the contact area.

It is not desirable that any liquid strike in the area adjacent the bosses 25 and 26 or the flexible legs 28a and 28b. To prevent this occurrence, the upper surfaces of opposing actuator flanges 32 and 33 have been cleverly formed with open ducts or grooves 34 and 35 which receive the liquid seepage 36 shown in FIG. 6 and direct the liquid away from flange 32 and 33 toward flanges 30 and 31. As can be seen in FIGS. 3 and 5, the ducts 34 and 35 extend slightly further towards the edge of flange 30 than towards the edge of flange 31 and the ends of the ducts adjacent flange 30 are slightly lower than the opposite ends. Thus, most liquid caught by the ducts tends to flow towards flange 30. The reason for this arrangement is that flange 30 extends toward the front wall 12 of housing 10 which is further from the electrical circuitry of the can opener. Accordingly, it can be seen that all liquid seepage is directed away from the critical areas of the switch. With this unique but simple actuator and switch arrangement, the motorized applicant housing can be wiped with a wet sponge without impairing the safety and reliability of the appliance.

While a specific embodiment of this invention has been shown and described, it should be understood that this invention is not limited to that particular construction. Accordingly, it is intended that the appended claims include all such modifications and variations which fall within the true spirit and scope of this invention.

What I claim is:

1. In a motorized appliance having a housing, a top wall on said housing having an aperture therein, and means for controlling the energizing of said appliance comprising: an actuator having a projection portion extending through said aperture and laterally extending flange means within said housing to prevent the removal of said actuator from said housing, a pair of normally open contacts, one of said contacts fixed within said housing and the other of said contacts carried by said actuator and movable into engagement with said first contact, a resilient element having a pair of resilient legs secured to said actuator by said movable contact so that the actuator is biased upwardly away from said fixed contact, and duct means formed on the upper surface of said flange means for directing liquids seeping through said aperture onto said flange away from said switch contacts and said resilient element.

2. A motorized appliance having a metallic housing including a top generally horizontal wall having an aperture therein, an insulating support plate supported beneath said top wall opening in generally parallel relation to the top wall, means supporting said support plate including a pair of spaced bosses formed integral with said housing and extending adjacent opposite sides of said support plate; an electrical switch assembly for controlling the energization of said appliance including a manually movable switch actuator having a projection extending through said aperture and flange means extending outwardly from all sides of the projection beneath the top wall surface surrounding the aperture, a switch contact movable by said actuator, a fixed switch contact mounted on said plate beneath the movable contact, a generally U-shaped resilient element having a pair of resilient legs extending between said actuator and said support plate with said legs engaging said plate and the bight portion of element engaging the actuator so that the actuator projection is urged upwardly into the opening, said actuator legs oriented so that they extend in the direction toward said bosses, said flange means including a first pair of flanges which extend from opposite sides of said projection beyond said actuator legs, and a second pair of flanges which extend from the other two opposite sides of the projection beyond the edges of said support plate, each of said first pair of flanges having a duct in its upper surface adjacent said projection directed toward one of said second pair of flanges, said second pair of flanges being slightly tapered downwardly from said projection so that liquid seeping through said top wall aperture and reaching said flange means is directed away from said switch contact area and beyond the support plate.

3. A motorized appliance having a metallic housing including a top generally horizontal wall having a rectangular opening therein, an insulating support plate supported beneath said top wall opening in generally spaced parallel relation to the top wall by means formed integral with said housing and extending adjacent two opposite sides of said support plate; an electrical switch assembly for controlling the energization of said appliance including a manually movable switch actuator having a rectangular projection extending through said opening and a flange means extending outwardly from all sides of the projection beneath the top wall surface surrounding the opening, a movable switch contact carried by the lower surface of said actuator projection, a fixed switch contact mounted on said plate beneath the movable contact, metallic resilient means urging said projection upwardly, said flange means including a first pair of flanges extending from opposite sides of said projection beyond said resilient means and a second pair of flanges extending from the other two opposite sides of the projection beyond the edges of said support plate, each of said first pair of flanges having a duct in its upper surface adjacent said projection directed toward said second pair of flanges, said second pair of flanges being slightly tapered downwardly from said projection so that liquid seeping through said top wall aperture and reaching said flange means is directed away from said switch contact area and beyond the support plate.

4. A manually movable switch actuator for an electric switch comprising: an upwardly extending projection and flange means laterally extending outwardly from all sides of the lower part of the projection, said flange means including a first pair of flanges which extend from opposite sides of said projection and a second pair of flanges which extend from the other two opposite sides of the projection, each of said first pair of flanges having a duct in its upper surface adjacent said projection directed toward said second pair of flanges, and said second pair of flanges being slightly tapered downwardly from said projection so that when said actuator is positioned with its projection extending upwardly through an opening in a horizontally oriented wall liquid seeping between the opening and the projection and reaching said flange means is directed away from the projection so as to protect the area directly beneath the actuator.

5. A manually movable switch component comprising: an actuator having an upwardly extending projection and flange means laterally extending outwardly from all sides of the lower part of the projection, said flange means including a first pair of flanges which extend from opposite sides of said projection and a second pair of flanges which extend from the other two opposite sides of the projection, a switch contact carried on the lower surface of said actuator, and a generally U-shaped resilient element secured to said actuator by said contact extending through the bight portion of the element so that the legs extend downwardly and outwardly, said element oriented so that the legs extend beneath said first pair of flanges, each of said first pair of flanges having a duct in its upper surface adjacent said projection directed toward one of said second pair of flanges, and said second pair of flanges being slightly tapered downwardly from said projection so that when said switch component is positioned with its actuator projection extending upwardly through an opening in a horizontal extending wall liquid seeping between the opening and the projection and reaching said flange means is directed away from the projection so as not to fall onto the area adjacent the contact and resilient element beneath the actuator.

6. An electric can opener comprising: a housing including a top generally horizontal wall and depending side walls, said top wall having an aperture therein; an electric switch for controlling the energization of said can opener including a fixed contact mounted on an insulating plate extending beneath said top wall aperture and a movable contact positioned above said fixed contact; an integrally formed switch actuator including a portion carrying said movable contact, an upwardly extending shank and outwardly extending flange means integrally formed with the lower portion of said shank, said shank being slightly smaller than the aperture formed in said generally horizontal top wall so that it may be readily reciprocated up and down within said aperture, said flange means being larger than said aperture so that said flange means engages the top lower surface of said generally horizontal wall when said actuator is moved up within said aperture, said flange means being slightly tapered downwardly from the shank of said actuator to direct any liquid seeping through said aperture away from the switch contact area beneath the actuator, two liquid ducts integrally formed in the central upper portion of said flange means on opposite sides of said shank for directing liquids outwardly away from the switch contact area beneath the actuator, the lowermost walls of said ducts positioned above the outer portions of said flange means so that liquid from said ducts will flow outwardly onto the outer portions of the flange means.

References Cited by the Examiner
UNITED STATES PATENTS

| | | | |
|---|---|---|---|
| 367,475 | 8/1887 | Van Depoele | 174—40 X |
| 1,361,326 | 12/1920 | Hachmann | 174—211 X |
| 1,549,589 | 8/1925 | Matthews | 174—211 X |
| 2,829,222 | 4/1958 | Dunham | 200—168 |
| 3,197,557 | 7/1965 | Tromsness | 174—211 X |
| 3,222,467 | 12/1965 | Meyer | 200—168 X |

ROBERT K. SCHAEFER, *Primary Examiner.*

H. O. JONES, *Assistant Examiner.*